United States Patent [19]
Kim

[11] Patent Number: 5,313,495
[45] Date of Patent: May 17, 1994

[54] DEMODULATOR FOR SYMBOLS TRANSMITTED OVER A CELLULAR CHANNEL

[75] Inventor: Youngky Kim, Potomac, Md.

[73] Assignee: Hughes Aircraft Company, Los Angeles, Calif.

[21] Appl. No.: 881,938

[22] Filed: May 12, 1992

[51] Int. Cl.$^5$ .............................................. H04L 27/06
[52] U.S. Cl. ...................................... 375/94; 375/101
[58] Field of Search ....................... 375/39, 94, 96, 99, 375/101; 371/43

[56] References Cited

U.S. PATENT DOCUMENTS

| | | | |
|---|---|---|---|
| 5,146,475 | 9/1992 | Kubo | 375/94 |
| 5,199,047 | 3/1993 | Koch | 375/96 |
| 5,202,903 | 4/1993 | Okanoue | 375/94 |

*Primary Examiner*—Stephen Chin
*Assistant Examiner*—Young Tse
*Attorney, Agent, or Firm*—Gordon R. Lindeen, III; William J. Streeter; Wanda K. Denson-Low

[57] ABSTRACT

A lower order Viterbi system for estimating symbols being transmitted over a digital cellular channel. The received signal is oversampled at a rate at least twice the frequency of the symbol duration. The energy contained in the main and interference symbol signal is thus sampled and permits a superior BER to be obtained. The branch metric for the lower order Viterbi algorithm is calculated using both signal samples. Channel status information is individually estimated for both samples, further improving system BER. The channel status is obtained for both frequency offset errors, amplitude fading and phase occurring within the channel.

7 Claims, 2 Drawing Sheets

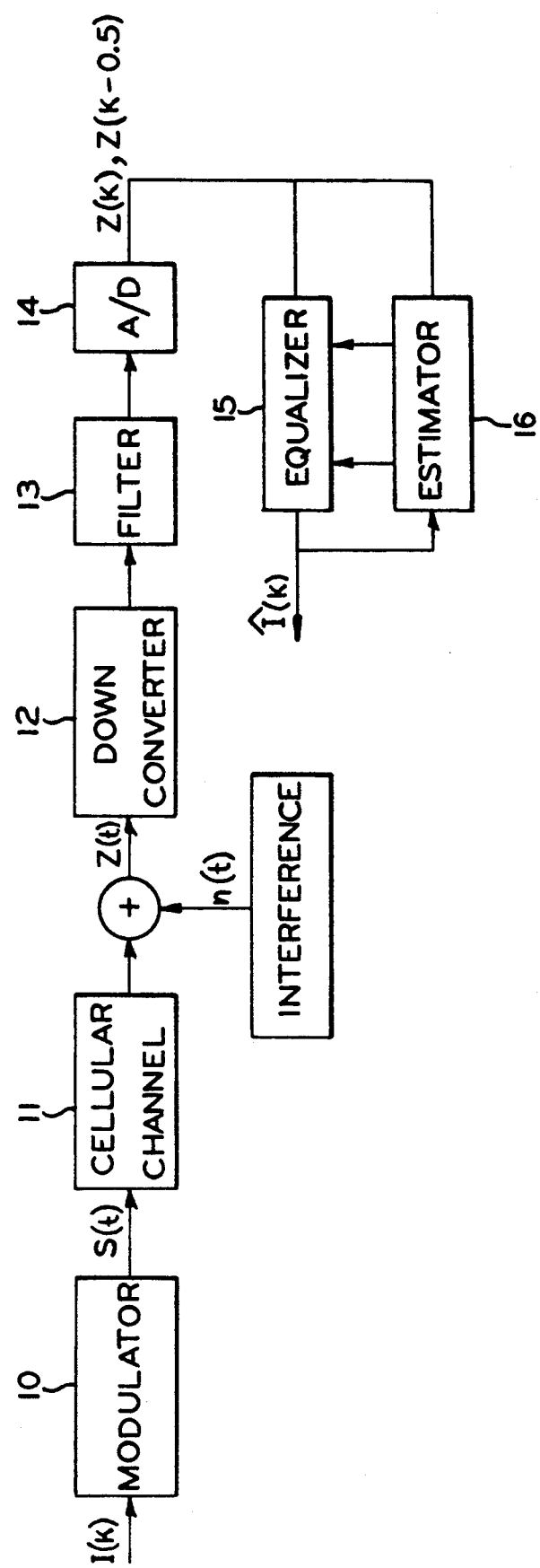
FIG_1

DEMODULATOR FOR SYMBOLS TRANSMITTED OVER A CELLULAR CHANNEL

The present invention relates to the digital cellular communications art. Specifically, a system employing maximum-likelihood sequence estimator (MLSE), which is implemented using a Viterbi algorithm, is described employing a minimum number of states for obtaining symbol data at a minimum bit error rate in a multipath environment.

Digital communication systems are employed over multipath fading channels. These systems generate symbols from digital data, and modulate the symbols on a carrier signal. The original digital data may, in fact, be telephone traffic, digitized and then converted to a sequence of symbols modulated on a carrier signal for transmission over a communications channel.

One of the well-known techniques for implementing digital communications is the DQPSK modulation system. In these systems, the digital symbols, resulting from encoding digital data to be transmitted, are sent as a sequence over a band-limited channel as discrete phase signal points selected from an available signal point alphabet. Certain dependencies are introduced between successive signal points in the sequence to increase the immunity to noise and distortion.

Transmission of the digital symbols over a communication channel which is subject to multipath phenomena produces inter-symbol interference, wherein the same symbol transmission may arrive at the receiver from more than one path. To cope with such inter-symbol interference, various equalization schemes have been provided. One of the more common techniques is the use of equalizers at the receiver using the Viterbi algorithm in an MLSE estimator, known as Viterbi equalizers, for detecting the sequence of transmitted symbols received over a noisy channel with inter-symbol interference. These techniques are described in various references including U.S. Pat. No. 4,713,829, as well as in the technical literature, such as the article "Maximum-Likelihood Sequence Estimation of Digital Sequences in the Presence of Inter-Symbol Interference", IEEE Trans. Information Theory, May 1972. These techniques all provide for a predictive system for estimating the symbol which may be subject to inter-symbol interference.

The Viterbi equalizer may require excessive computation overhead when estimating symbols which are subject to inter-symbol interference. In cellular communication systems, because geographic changes of the transmitter are frequent and unpredictable, fading and inter-symbol interference become excessive and the use of a Viterbi equalizer requires that an algorithm be employed which implements 16 or 64 states. A simpler, four-state Viterbi equalizer using a first order least means square channel estimator only marginally meets the bit error rate requirements for the cellular system. The higher order, such as 16 or 64 state Viterbi equalizer, although providing reasonable performance in these environments, will require a prohibitive amount of computation. These higher state Viterbi equalizer systems employ about 16 times as much computation. Additionally, the decision delay incurred when using these higher state Viterbi algorithms makes channel estimation for the current signal being demodulated more difficult. As the estimation of frequency shifts and amplitude fading occurring in the channel are necessary in order to estimate the symbols using the Viterbi algorithm, long delays degrades performance. The large delay associated with the more complex Viterbi algorithms make the decision delay and attendant difficulties with channel prediction impractical in digital cellular communications.

This problem is recognized in a paper entitled "Delay Decision Feedback Sequence Estimation" IEEE Transactions on Communications, Volume 37,, No. 5, May 1989. The paper describes a type of decision feedback system which makes an effort to overcome the foregoing limitations with Viterbi equalizers. As the digital cellular channel has an extreme multipath fading phenomena, and a Doppler frequency spread which can be as wide as 200 Hz., efforts to make the Viterbi equalizer system work in the cellular environment have been especially difficult.

SUMMARY OF THE INVENTION

It is an object of this invention to provide a Viterbi equalizer system having a minimum number of states for use in a digital cellular communication system.

This and other objects of the invention are provided by an equalizer operating on the MLSE principle in conjunction with a channel estimator which can provide for an accurate determination of Rayleigh fading and Doppler shift occurring the channel which produces the signal for estimating. Doppler frequency tracking and multipath fading tracking are implemented in a single channel estimator.

In accordance with the preferred embodiment of the invention, a Viterbi equalizer is provided having only four states. In order to reduce the bit error rate produced from the Viterbi equalizer using only four states, the signal is oversampled which, in the preferred embodiment, is twice the normal symbol rate. The oversampling results in the use of energy in the main and interference symbol signal more effectively under sub-symbol multipath environments without increasing the number of states of the Viterbi algorithm. In the lower order four state Viterbi equalizer, the branch metrics for each of the four states are calculated using two samples, each representing a single symbol.

In addition to calculating the branch metrics based on two samples, channel estimation is based on oversampled symbol data. A second order, least means square algorithm is employed in the channel estimator, which is capable of estimating both frequency and amplitude shifts of the modulated symbol signals carried over the cellular channel. These channel estimates are utilized in the branch metric computation.

Having once computed the branch metric, the Viterbi algorithm execution proceeds and decisions as to the symbol value, I(k), are made.

By using the oversampling technique to calculate the branch metrics in the Viterbi process, it is possible to reduce the bit error rate at least 35%, compared to the bit error rate obtained with a conventional four-state Viterbi equalizer having a communications path delay which is substantially ½ the symbol time. Under multipath conditions where the delay is less than one symbol time, the system provides smaller bit error rates than is achievable with conventional data recovery techniques. Bit error rates at lower signal to interference ratios (C/I) are achievable, which results in an increased cell capacity. The cell size can accordingly be increased, cutting down on the number of required cells and overall system expense.

DESCRIPTION OF THE FIGURES

FIG. 1 is a system block diagram of apparatus for generating symbols for transmission over a digital cellular communication channel, and receiving and estimating such symbols.

DESCRIPTION OF THE PREFERRED EMBODIMENT

Figure 2A:
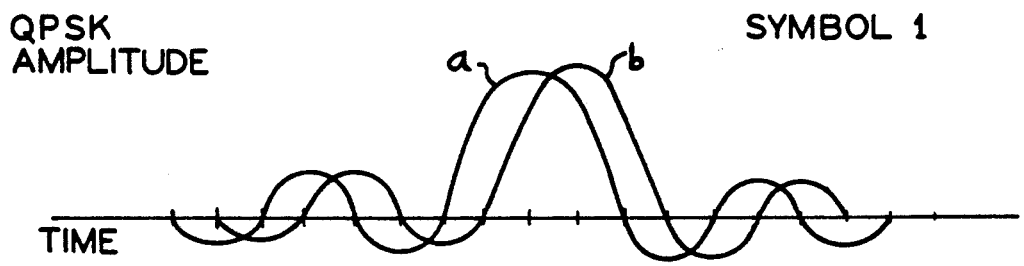
FIG. 2A illustrates the amplitude function of a signal modulated with a first symbol being transmitted over a channel subject to fading and multipath interference.

Referring now to FIG. 1, there is shown a block diagram of a system for transmitting and receiving binary data which has been encoded into symbols I(k) over a cellular channel 11. The binary code symbols I(k) are applied to a carrier frequency modulator 10. The carrier frequency modulator 10 which, in the preferred embodiment, may be a DQPSK modulator, produces a modulated signal S(t). The modulated carrier signal S(t) may be then transmitted over a cellular channel 11 which is subject to multipath fading and interference, and is received as a signal Z(t).

The receiver includes a down converter 12, filter 13 and an analog to digital converter 14. The analog to digital converter 14 produces a sampled signal Z(k) which is identified as a replica of the signal S(t).

$$Z(k) = f(k,0) I(k) + f(k,1)I(k-1) + n(k)$$

As a result of the channel 11, the signal Z(k) includes a frequency off set introduced by Doppler effects occurring within the channel 11. These Doppler effects represent a frequency offset between the carrier frequency transmitted and that received. n(k) represents an interference function of the channel.

Additionally, the effects of the cellular channel 11 are represented by the terms which relate to the multipath effects on signal amplitude, phase and frequency occurring within the channel 11. These factors are represented as follows for each symbol I (k), I(k−1) at the kTs sampling time:

f(k, 0)

f(k, 1)

As the source of the symbol transmission in a cellular application may well be moving, the Doppler shifts may change as well as the amplitude effects of the multipath channel on a very rapid and unpredictable basis.

The solution of the foregoing equation Z(k) will result from the Viterbi equalizer 15 which operates on the signal Z(k). In order to determine the value of the symbol I(k), information from a channel estimator corresponding to the value of the terms f(k, 0) and f(k, 1) is needed. As in a conventional Viterbi equalizer, a channel estimator 16 is provided which will supply these terms.

In estimating for the value of the symbols I(k), the Z(k) signal is accumulated for a number of symbol times to provide more reliable estimation for the value of I(k).

A Viterbi equalizer 15 having four states is provided for estimating the value of I(k). In order to obtain a bit error rate of 3% or better under L/I = 1ηdB, acceptable for digital cellular communications applications, a Viterbi equalizer 15 of approximately 16 states may be required. This presents an unacceptable computation overhead and decision delay.

In order to avoid the consequences of the necessity for the higher state Viterbi equalizer to obtain reasonable performance, the present invention has been devised.

The present invention takes advantage of the nature of the transmitted symbol signals. Referring now to FIG. 2A, there is shown a carrier signal modulated with a symbol signal I(O) received over a multipath channel, which includes a first main symbol signal (a) and a delayed version thereof (b) which occurs over a second path in the channel, and is considered an interfering symbol signal. The received symbol signal will be a composite of these two symbol signals.

Each horizontal time division of FIG. 2A represents one-half a symbol time. The main lobe of a transmitted symbol occupies approximately two symbol times.

Figure 2B:
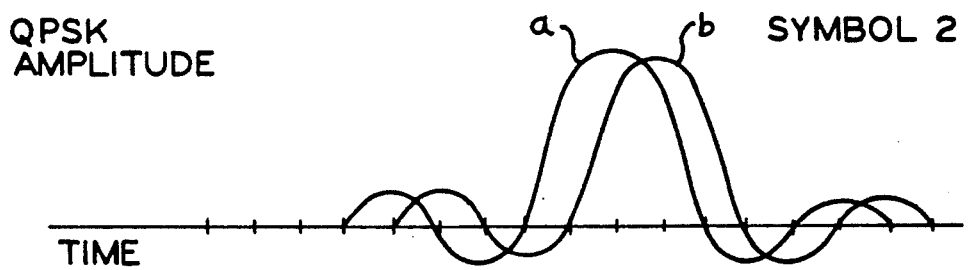
FIG. 2B illustrates the amplitude function of a consecutive second symbol being transmitted over the channel of FIG. 2A.

Shown in FIG. 2B is a carrier signal modulated with a second symbol signal, I(l) which occurs one symbol time later, and which is also subject to multipath effects. The delayed version of the second symbol signal b will be combined with the first version a to produce the composite symbol signal I (1). The present invention seeks to provide multiple samples of the same symbol signal to a Viterbi equalizer having a minimum number of states. In this way, the energy contained in the main and interference symbols may be used more effectively in the Viterbi equalizer system to estimate the symbol value in the presence of inter-symbol interference due to sub-symbol multipath. This provides an oversampled Viterbi decoding system which does not increase the number of states of the Viterbi algorithm. Thus, sampling the signals at ½ symbol intervals permits sufficient information to be obtained to use the lower state, less computationally burdensome Viterbi algorithm.

In order to implement the oversampling the A/D converter 14 samples received signals at a rate of about two samples per symbol time. Accordingly, the output of the A/D converter 14 is the signal Z(k) and Z(k−0.5) for each symbol time.

Figure 3:
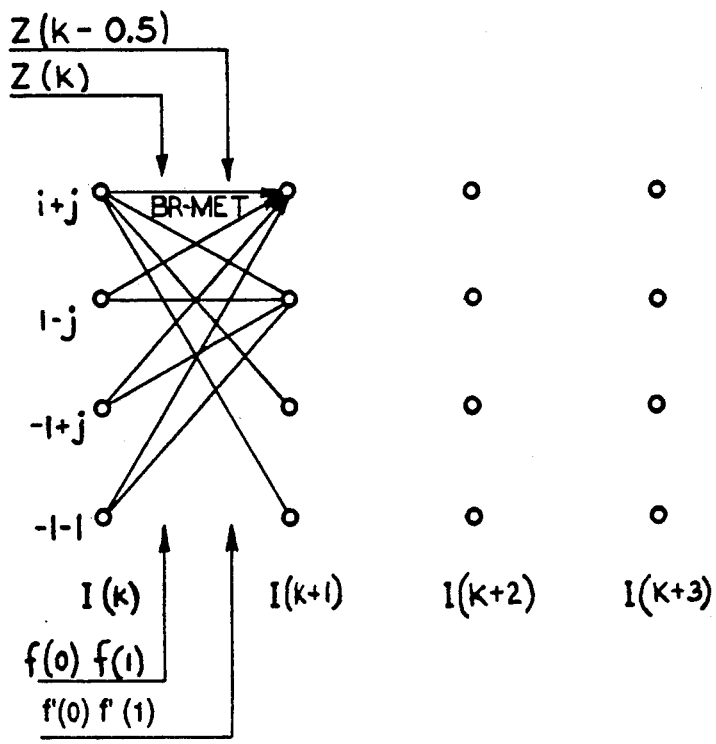
FIG. 3 is a diagram of the Viterbi trellis for executing the branch metric calculation used in the Viterbi algorithm for an oversampled signal.

Referring now to FIG. 3, there is shown a trellis diagram of the four state Viterbi decoding algorithm. Two signals Z(k) and Z(k−0.5) representing samples of the same symbol spaced in time ½ a symbol time are used to form a branch metric.

Channel estimations f(O), f(l) and f'(O) and f'(l) occurring ½ sample interval later are required to calculate the branch metric of the Viterbi algorithm. Using the oversampled signals Z(k) and Z(k−0.5) and the channel estimations for these signals the following branch metric is obtained:

$$br\_met[Z(k), Z(k-0.5), I(k)] =$$

$$\left| Z(k) - \sum_{n=0}^{1} f(n,k)I(k-n) \right|^2 +$$

$$\left| Z(k-0.5) - \sum_{n=0}^{1} f'(n,k)I(k-n) \right|^2$$

This branch metric obtained from this novel oversample input will provide for an estimation of the symbol I(k) as well as the subsequent symbols I(k+n).

The four state Viterbi equalizer system of FIG. 3, when used in a two-path Rayleigh channel, having standard IS-54 signalling, provides for a 35% bit error rate reduction from a conventional Viterbi equalizer system of four states.

In a second aspect of the invention, the channel estimator 16 makes good use of the ½ symbol sampling period to obtain estimates for signal frequency offsets within the multipath channel, as well as for amplitude fading of the signals within the multipath channel.

In conventional channel estimation, a separate frequency tracking loop is employed to identify Doppler frequency shifts occurring within the channel. From the present invention, it is possible to provide for an estimate of both Doppler frequency shift as well as the multipath rayleigh fading which occurs over the channel as a single function.

The channel estimator employs a second order least means square algorithm. The two channel estimation quantities representing the frequency as well as amplitude changes occurring within the multipath channel are represented by $f(0, k+1)$ and $f(1, k+1)$, which are complex numbers. $f(0, k+1)$ represents the estimated channel status for the first received symbol (a) and $f(1, k+1)$ represents the estimated channel status for the interfering symbol (b) as represented in FIG. 2A. The channel estimation is made for a second sample, ½ symbol time away, corresponding to the signal $Z(k-0.5)$. These two identical estimations will give accurate estimations of channel status. By having current frequently updated, channel status information available for estimating, long decision delays are avoided and the foregoing low bit error rates are achieved.

These terms can be considered to be the composite of an amplitude and phase function $f(0,k)$, $f(1,k)$, a frequency shift portion $f_s(0, k+1)$, $f_s(1, k+1)$ and an estimation of the error occurring in determining the symbol I(k). This can be represented as the following:

(1) $f_s(0,k+1) = f_s(0,k) + K_1(Z(k) - f(1,k)I(k-1)I^x(k))$     (1)

(2)
$f_s(1,k+1) = f_s(1,k) + K_1(Z(k) - f(0,k)I(k-1)I^x(k-1))$     (2)

(3)
$f(0,k+1) = f(0,k) + f_s(0k+1) + K_2(Z(k) - f(0,k) - f(1,k)I(k-1)I^x(k))$     (3)

(4) $f(1,k+1) = f(1,k) + f_s(1,k+1) + K_2(Z(k) - f(0,k+1)I(k) - f(1k)I(k-1)I^x(k-1)$     (4)

In the foregoing formula, $f_s(*)$, $f(*)$ are all complex numbers, and $I^x(k)$ is the conjugate of the symbol I(k).

It should be remembered that $k-1$ and $k+1$ are symbol times occurring before and after symbol time K.

Equations (1) and (2) represent the frequency component estimation for the first received symbol signal, and the second, interfering symbol, respectively. These estimates are arrived at by having a first function $f_s(O,k)$ and $f_s(1,k)$ which models the underlying hidden frequency characteristic of the channel for both the first received symbol and interference symbol.

The remaining terms of equations (1) and (2) represent an error function, computed for each symbol, representing the amplitude and phase error in the channel for the primary symbol and interfering symbol, multiplied by a constant $K_1$.

Equations (3) and (4) represent the composite channel estimate for each of the received signals. The previously determined frequency component, $f_s$, is combined with the amplitude and phase error, multiplied by the constants $K_2$.

This second order least mean square algorithm, represented by equations (1), (2), (3) and (4) is also applied to the second sample value $Z(k-0.5)$. These estimations are made at symbol time $(k-0.5)$. Similar estimations of channel performance are obtained to calculate the branch metric based on the additional samples. Thus, each of the samples $Z(k)$ and $Z(k-0.5)$ have an estimation of channel status taken at the time each is received.

The result of the generalized second order IMS algorithm represented by equations (1), (2), (3) and (4) produces the same performance as the first order IMS algorithm, used to estimate channel status in the prior art channel estimators under no frequency offset. The $f_s$ component represents the frequency error which was normally obtained from a second order phase locked loop which tracks frequency error. The overall composite error represented by equations (3) and (4) provides for an even better improvement in bit error rate when frequency offsets $f_s$ of up to + or −100 Hz. is present.

The foregoing function can also be used to track symbol timing since the term f(I, k) changes depending on the symbol timing.

Having the appropriate branch metric calculation, in accordance with the foregoing, using the oversampled signal, it is possible to utilize the energy in the main and interference symbol shown in FIGS. 2A and 2B to utilize the inter-symbol interference due to sub-symbol multipath more effectively without increasing the number of states for the Viterbi equalizer.

The foregoing equalizer and channel estimator are implemented in a Motorola digital signal processing circuit (DSP 96000). The digital signal processing circuit can be programmed to compute the channel estimates f(n, k) and f'(n, k), as well as perform the Viterbi equalizer function calculating the branch metric and obtaining the value of each received symbol.

Thus, there has been described a way of using the Viterbi equalizer system in a cellular application which is subject to considerable Doppler shift, as well as multipath fading, without enduring excessive computational overhead. Those skilled in the art will recognize yet other embodiments of the invention described by the claims which follow.

What is claimed is:

1. A circuit for processing a data signal transmitted as symbols in a multipath fading transmission channel comprising:

a sampling circuit for producing a sampled data signal at a rate of substantially twice the rate of symbols being transmitted to obtain signal samples of a transmitted symbol signal and an interference symbol signal;

a channel estimator connected to receive said sampled signal, computing a frequency offset function, an amplitude fading function and a phase function, occurring in said transmission channel on a two sample per symbol basis; and, a Viterbi equalizer for estimating the value of each received symbol from said sampled data, representing a transmitted symbol signal and an interference symbol signal, including calculating a branch metric for each possible state of said symbol based upon two samples per symbol and based upon a frequency offset, amplitude fading, and phase determined from said channel estimator, said equalizer providing from said sampled data signal an estimate of said symbol from energy contained in said symbol signal and interference symbol signal.

2. The circuit of claim 1 wherein said Viterbi equalizer is a four state equalizer.

3. The circuit of claim 1 wherein said channel estimator derives an estimate of an inter-symbol interfering signal occurring in said transmission channel, and an estimate of a main symbol signal.

4. A method for processing a data signal transmitted as symbols in a multipath fading transmission channel comprising:

sampling said data signal at a rate of substantially twice the rate of symbols being transmitted;

estimating from said sampled data signal a frequency offset function, an amplitude fading function, and a phase function occurring in said transmission channel on a two sample per symbol basis; and, estimating the value of each received symbol from said sampled data using a Viterbi equalizer, including calculating a branch metric for each possible state of said symbol based upon two samples per symbol and based upon said estimated frequency offset, estimated amplitude fading, and estimated phase.

5. The method according to claim 4 wherein said branch metric is $$br\_met[Z(k), Z(k-0.5), I(k)] =$$

$$\left| Z(k) - \sum_{n=0}^{1} f(n,k) I(k-n) \right|^2 +$$

$$\left| Z(k-0.5) - \sum_{n=0}^{1} f'(n,k) I(k-n) \right|^2$$

where $Z(k)$ and $Z(k-0.5)$ are first and second samples of a symbol $I(k)$, $I(k-n)$ are subsequent symbols, and $f(n, k)$ and $f'(n, k)$ are the estimates of said amplitude and frequency functions at the sample times producing $Z(k)$ and $Z(k-0.5)$, respectively.

6. The method according to claim 5, wherein $n=0$ produces an estimated amplitude and phase function for a first received primary symbol, and $n=1$ produces an estimated amplitude and phase function for a secondary interfering replica of the same symbol.

7. The method according to claim 6 wherein said estimated amplitude and phase function are a function of a model of the underlying hidden frequency characteristic of the channel $f_s(0, k)$ for said first received primary symbol and $f_s(1, k)$ for said secondary interfering replica of said symbol, and a computed symbol error for the primary symbol and secondary interfering symbol.

* * * * *